F. SIEMANN.
AGRICULTURAL MACHINE.
APPLICATION FILED APR. 5, 1912.
1,053,657.
Patented Feb. 18, 1913.
2 SHEETS—SHEET 1.
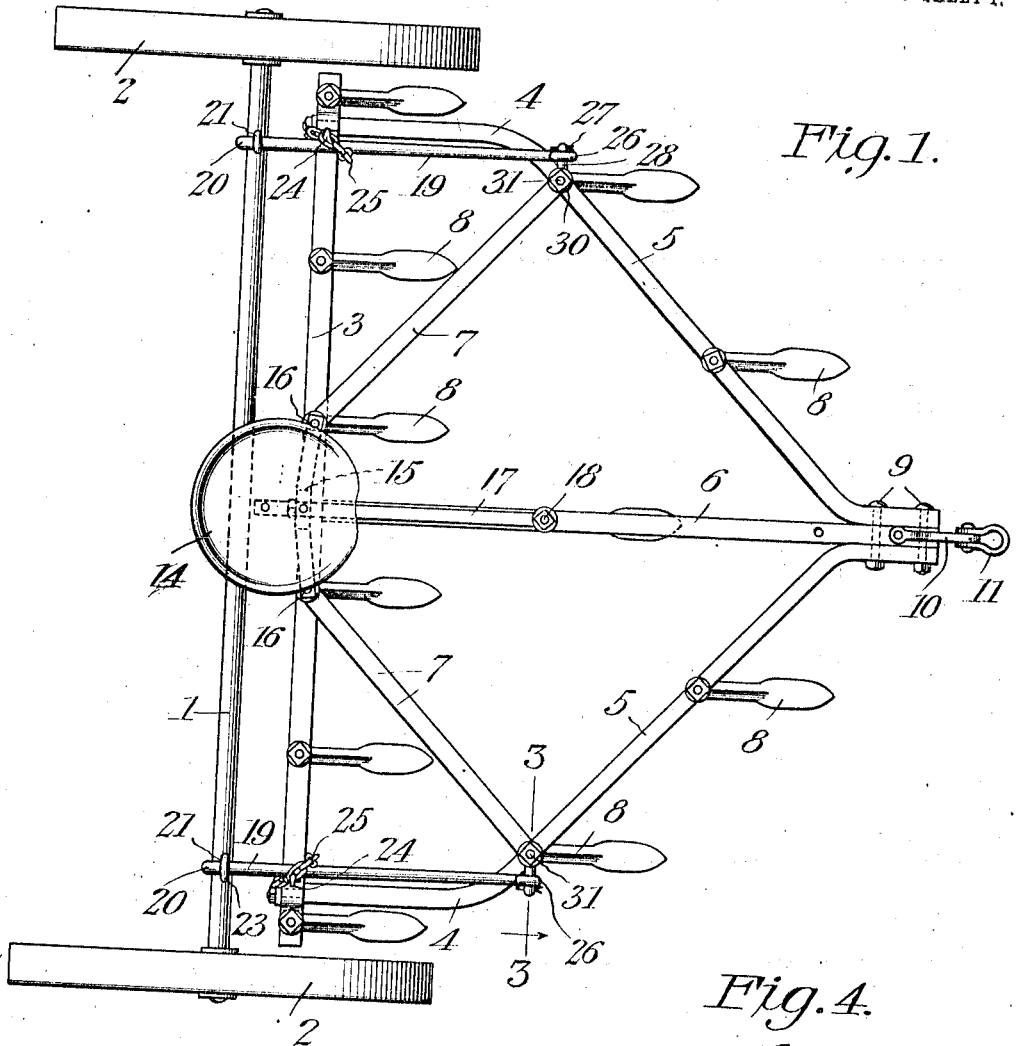
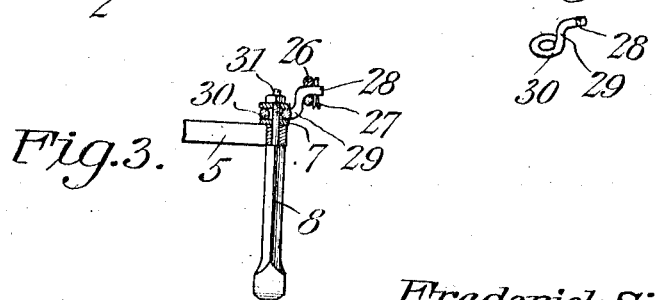
WITNESSES
Fenton S Belt
M. E. Moore
Frederick Siemann
INVENTOR
By Wm N Moore
Attorney

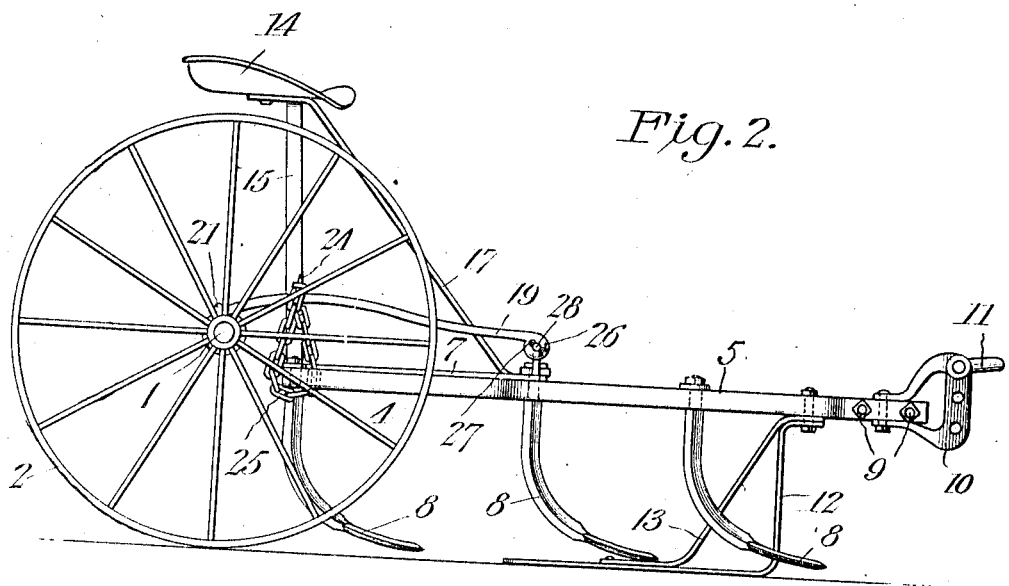
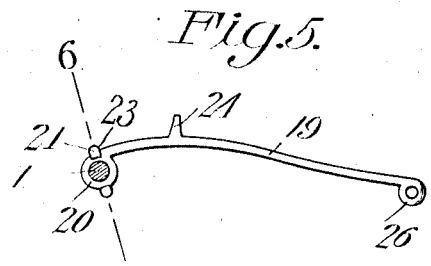
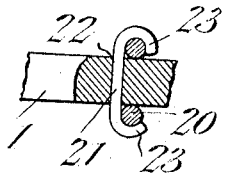
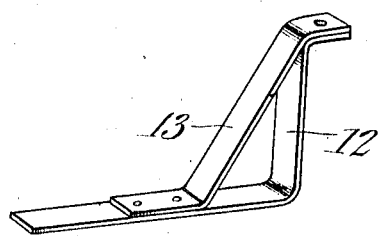

UNITED STATES PATENT OFFICE.

FREDERICK SIEMANN, OF FORT LUPTON, COLORADO.

AGRICULTURAL MACHINE.

1,053,657.

Specification of Letters Patent. Patented Feb. 18, 1913.

Application filed April 5, 1912. Serial No. 688,621.

*To all whom it may concern:*

Be it known that I, FREDERICK SIEMANN, a citizen of the United States, residing at Fort Lupton, in the county of Weld and State of Colorado, have invented certain new and useful Improvements in Agricultural Machines, of which the following is a specification.

My invention relates to improvements in agricultural machines, and refers particularly to a riding attachment for carders or harrows.

The leading object of the invention is to provide a riding attachment for land carders and harrows which may be mounted directly upon the equalizer bar of the machine, thereby adding the weight of the operator to insure its steady and smooth operation and a constant depth of cut for the ground working tools.

An important object of the invention is to provide a simple and durable connection between the axle of the machine and the frame whereby the operator may regulate the depth of cut.

A further object of the invention is to provide a novel form of connecting arm or rod for connecting the axle and the frame, said arm having a locking connection with the frame when the axle is fastened to the arm or rod.

Other objects of the invention are to provide a riding attachment for harrows or land carders which will be capable of use upon the machines of the present type now used; which attachment will be exceedingly simple and durable in construction; and which will be highly efficient and practical.

With the attainment of these and other objects in view, my invention broadly stated consists in the provision of a seat mounted upon the equalizer bar of the frame, arms connecting the axle with the teeth or tool carrying frame, and chains connecting the equalizer bar, axle and connecting arms, the invention further residing in certain novel features of construction and combinations of parts for service, substantially as disclosed herein.

Figure 1 is a top plan view of a land carder constructed in accordance with and embodying the principles of my invention. Fig. 2 is a side elevation of the same. Fig. 3 is a vertical sectional view on line 3—3 of Fig. 1. Fig. 4 is a detail view of a hook and eye device used to connect the arms and carder frame. Fig. 5 is a detail view, partly in section, of one of the connecting arms or rods. Fig. 6 is a sectional view, on an enlarged scale, taken on line 6—6 of Fig. 5, and Fig. 7 is a perspective view of the shoe detached from the frame.

In the drawings:—the numeral 1 designates the axle, 2 the ground wheels, 3 the equalizer bar, 4 the side bars, 5 the inclined bars, 6 the tongue, 7 the inclined brace rods, and 8 the ground working tools of an ordinary land carder, the tongue and forward part of the frame bars being secured together by means of the transversely extending bolts 9 and the tongue having the customary clevis 10, provided with a draft connection 11 for moving the carder through the field, a shoe 12 depending from the forward portion of the tongue and having a suitable brace 13, the shoe or runner permitting transportation.

The numeral 14 designates the operator's seat, supported from the equalizer bar by the inclined supports 15, secured at 16 thereto, and by the central support 17, secured at 18 to the tongue.

The axle is connected to the frame by means of the curved arms 19, formed at their rear ends with the eyes 20, which engage over the axle and are retained in place by the pins 21, passing through openings 22 in the axle and having their ends bent as at 23 to engage around the eyes of the arms. The arms are each provided with lugs 24 adapted to engage the links of the chains 25, passing over the axle and arms and connected to the equalizer bar. The forward extremities of the arms terminate in eyes 26, through which pass and are secured by means of cotter pins 27, the extensions 28 of the hooks 29, formed with eyes 30, through which pass bolts 31 for securing one end of the braces 7, a ground working tool 8, and one end of the inclined bars 5 of the frame together.

From the foregoing it will be seen that the links of the chains engage the lugs on the arms to regulate the depth of cut of the ground working tools to a predetermined level and that the operator can by reason of the peculiar connections between the axle and equalizer bar cause the ground working tools to bear more firmly into the ground. The depth of cut is determined by the length of the chains 25 as compared with the radius of the ground wheels 2, the connection between the axle and frame at all times retaining the rear end of the frame substantially at a predetermined level, but permitting the front end of the frame to assume various and varying levels.

A meritorious feature of the invention resides in the construction and connection of the forward ends of the arms 19 to the frame, the bolts 31 being utilized to both secure the ground working tools and the frame bars upon each other, as well as to retain the forward ends of the arms in place.

While I have shown and described my improvements applied to a land carder, it will of course be understood that I do not limit myself to any particular type of agricultural machine, but reserve the right to use the invention in any capacity where it would perform its functions in a thoroughly efficient and practical manner. Nor do I wish to limit myself to the precise details of construction herein shown and described, but may make such variations and modifications as fall clearly within the spirit and scope of the invention, as circumstances require.

It will be understood that in Fig. 2 the shoe or runner is shown in the position it occupies when my machine is in condition to be transported or drawn from place to place and that when it is desired to use the machine in the performance of its functions, the shoe or runner is removed, allowing the teeth or tools to be free to enter the ground.

I claim:—

1. The combination with an axle, of an equalizer bar loosely connected therewith, a tongue secured to said bar, and a seat supported from said bar and tongue and disposed in such a manner as to bring the weight of the operator directly over the equalizer bar.

2. The combination with an axle, of a frame connected therewith by means of arms formed with eyes at their rear ends to embrace the axle and having eyes formed upon their forward ends whereby they are connected to the frame, and means carried by said arms for retaining the rear end of the frame at a predetermined level.

3. The combination with an axle, of a frame associated therewith, arms connecting said frame and axle, chains passing over said arms and under the equalizer bar of the frame, and devices formed on said arms adapted to engage the chains for retaining the rear end of the frame at a predetermined level.

4. The combination with an axle, of a frame associated therewith, arms connecting said frame and axle and having eyes formed at their rear ends adapted to embrace the axle, means passing through the axle and engaging the eyes for retaining the arms upon the axle, eyes formed upon the forward ends of the arms, a device having an extension passing through each of said eyes and retained thereon, eyes formed on each of said devices, bolts passing through said eyes and the frame for securing the arms to the frame, and means passing over the arms and under the rear end of the frame for retaining the frame at a predetermined level.

5. The combination with an axle, of a frame associated therewith and having an equalizer bar, arms connecting said frame and axle, eyes formed upon the forward ends of said arms, a device engaging said eyes and being retained on the frame, and means including lugs formed on the arms and engaging chains passing over the arms and under the equalizer bar of the frame for retaining the frame in position.

6. The combination with an axle, of a frame associated therewith, arms connecting said frame and axle, and having eyes formed at their rear ends adapted to engage the axle, pins passing through openings in the axle and engaging said eyes for retaining the arms upon the axle, eyes formed upon the forward ends of the arms, a device having an extension passing through each of said eyes and retained thereon, eyes formed on each of said devices, bolts passing through said last-mentioned eyes and through the frame for securing the arms to the frame, and means including lugs formed on the arms and engaging chains passing over the arms and under the frame for retaining the frame in position.

In testimony whereof I affix my signature in presence of two witnesses.

FREDERICK SIEMANN.

Witnesses:
V. N. PECKHAM,
H. M. SIEMANN.